United States Patent
Sparacino

(10) Patent No.: US 7,325,814 B2
(45) Date of Patent: Feb. 5, 2008

(54) PORTABLE GAS CONTAINER CART

(76) Inventor: Ernest Sparacino, 419 Broadway, Massapequa Park, NY (US) 11762

( * ) Notice: Subject to any disclaimer, the term of this patent is extended or adjusted under 35 U.S.C. 154(b) by 239 days.

(21) Appl. No.: 11/238,578

(22) Filed: Sep. 29, 2005

(65) Prior Publication Data
US 2007/0096413 A1 May 3, 2007

(51) Int. Cl.
B62B 1/00 (2006.01)
(52) U.S. Cl. .............................. 280/47.131; 280/47.17; 280/79.6
(58) Field of Classification Search ........... 280/47.131, 280/47.17, 47.24, 47.26, 79.4–79.6; 414/910, 414/911, 24; 211/19, 20, 23, 24
See application file for complete search history.

(56) References Cited

U.S. PATENT DOCUMENTS

| | | | | |
|---|---|---|---|---|
| 2,763,383 A | * | 9/1956 | McCoy | 414/542 |
| 2,851,235 A | * | 9/1958 | Henig | 410/44 |
| 2,861,813 A | * | 11/1958 | Rainey | 280/143 |
| 3,436,093 A | * | 4/1969 | Ruffley, Jr. | 280/47.27 |
| 3,627,340 A | * | 12/1971 | Shippey | 280/839 |
| 3,756,616 A | * | 9/1973 | Sapp, Sr. | 280/79.4 |
| 4,424,999 A | * | 1/1984 | Commins | 294/142 |
| 4,842,139 A | * | 6/1989 | Krieg | 206/386 |
| 4,921,270 A | * | 5/1990 | Schoberg | 280/655.1 |
| 5,253,972 A | * | 10/1993 | Drew et al. | 414/469 |
| 5,871,316 A | * | 2/1999 | Bills | 410/42 |
| 6,302,414 B1 | * | 10/2001 | Berthiaume et al. | 280/47.18 |
| 2005/0073119 A1 | * | 4/2005 | Kirakosyan | 280/47.26 |

* cited by examiner

Primary Examiner—Paul N. Dickson
Assistant Examiner—Vaughn T. Coolman
(74) Attorney, Agent, or Firm—Scully, Scott, Murphy & Presser, P.C.

(57) ABSTRACT

A portable gas container cart comprising (a) two parallel plates comprising a top portion, a bottom portion, a frontal end and a back end, wherein said parallel plates are connected by a plurality of connecting elements; (b) a pair of grooves located on the top portion of said parallel plates and centrally located between the frontal and back ends of said parallel plates, wherein said pair of grooves are capable of holding said gas container; (c) a rotatable handle comprising a distal end and a proximal end, wherein said proximal end is rotatably connected to one of said connecting elements, and wherein said distal end can be rotated across the bottom portion of said parallel plates and attached to another of said connecting elements; (d) at least one wheel attached to each of said parallel plates on the back end of said parallel plates; and (e) at least one fastening element, comprising a first end attached to one of said connecting elements, and a second end which can be reversibly attached to a second of said connecting elements, wherein said first and second ends of said fastening element are attachable to connecting elements situated on both the frontal end and the back end of said parallel plates.

10 Claims, 2 Drawing Sheets

PORTABLE GAS CONTAINER CART

FIELD OF THE INVENTION

Figure 1:
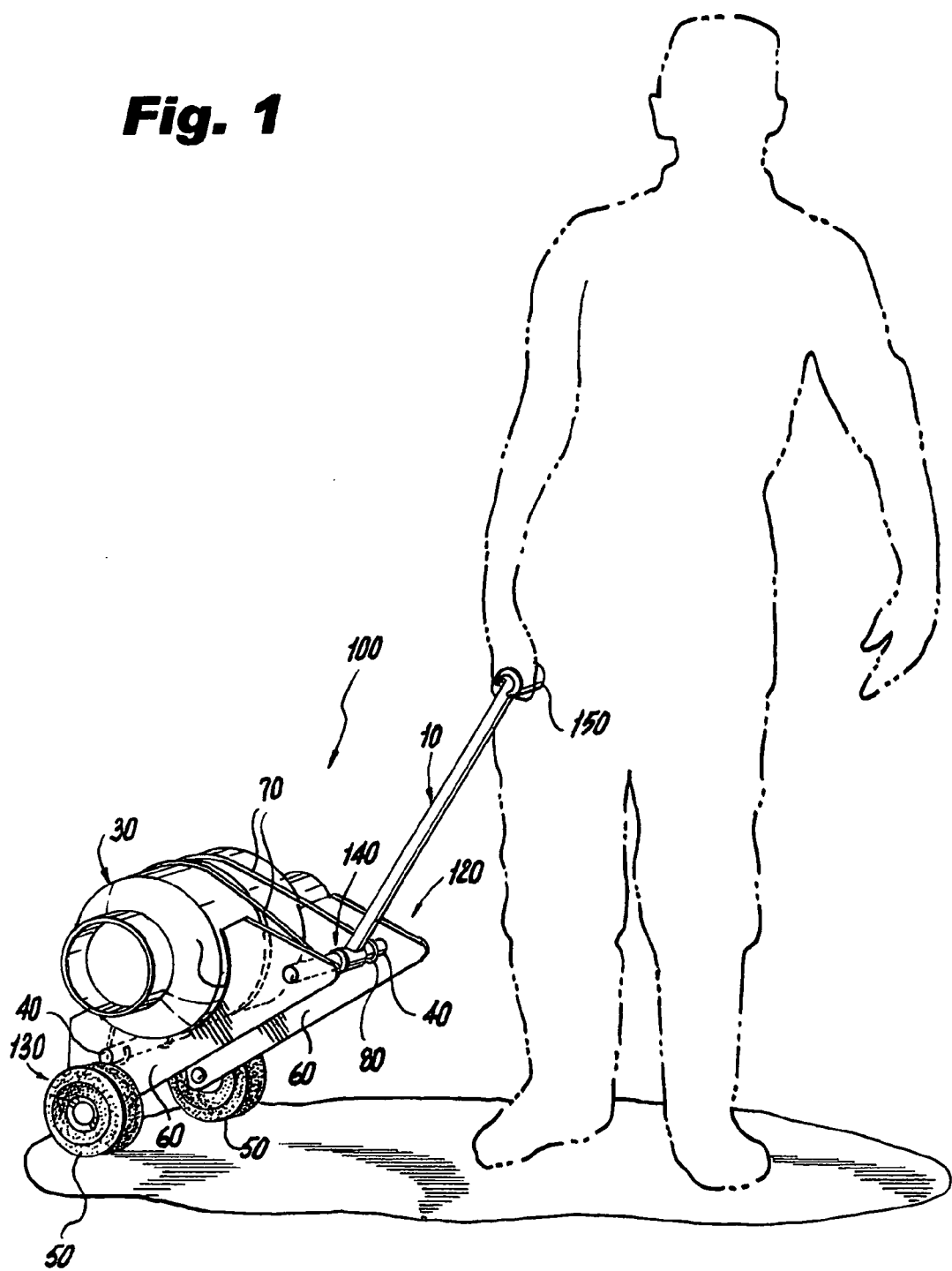

The present invention relates generally to a portable container gas cart, and in particular to a portable gas container cart useful for barbeques.

BACKGROUND OF THE INVENTION

Gas container carts, and in particular portable gas container carts, are typically used to provide access to gases to various locations. For example, fire and rescue personnel use air supply carts to provide air supply in locations where the ambient air supply may be limited and/or contaminated. In other applications, construction and steel workers use gas container carts to transport various cylinders of welding gases and the like. U.S. Pat. No. 5,318,322 discloses a cart for a barbeque grill, which holds the barbeque grill and the gas tank. However, the cart in the '322 patent takes up a large amount of space and is bulky to move around.

Accordingly, there is a need for new gas container carts that are capable of easily transporting gas tanks.

SUMMARY OF THE INVENTION

The invention relates to portable gas container carts, preferably for the transport of gasoline containers used for barbeques.

In one aspect, the invention relates to a portable gas container cart comprising (a) two parallel plates comprising a top portion, a bottom portion, a frontal end and a back end, wherein the parallel plates are connected by a plurality of connecting elements; (b) a pair of grooves located on the top portion of the parallel plates and centrally located between the frontal and back ends of the parallel plates, wherein the pair of grooves are capable of holding the gas container; (c) a rotatable handle comprising a distal end and a proximal end, wherein the proximal end is rotatably connected to one of the connecting elements, and wherein the distal end can be rotated across the bottom portion of the parallel plates and attached to another of the connecting elements; (d) at least one wheel attached to each of the parallel plates on the back end of the parallel plates; and (e) at least one fastening element, comprising a first end attached to one of the connecting elements, and a second end which can be reversibly attached to a second of the connecting elements, wherein the first and second ends of the fastening element are attachable to connecting elements situated on both the frontal end and the back end of the parallel plates.

In another embodiment, the fastening elements of the portable gas container are capable of fastening a gas container in the pair of grooves of the parallel plates. Preferably, the grooves correspond to the shape of the gas container. In another embodiment, the length of the fastening element is adjustable.

In another embodiment, the distal end of the rotatable handle is in the shape of a hook and can latch onto a connecting element located on the frontal end or back end of the parallel plates.

In another embodiment, the gas container is a propane or natural gas tank. Preferably, the gas container is suitable for barbeque grills.

In another embodiment, the parallel plates are connected by two connecting elements, wherein one connecting element is on the frontal end of the parallel plates, and the second connecting element is on the distal end of the parallel plates.

In another embodiment, the connecting elements are cylindrical by shape.

BRIEF DESCRIPTION OF THE DRAWINGS (FIG. 1) of the drawing depicts a "SIDE VIEW" with the gas container.

(FIG. 2) of the drawing depicts a "REAR VIEW" with the gas container.

(FIG. 3) of the drawing depicts a "TOP SIDE VIEW" without the gas container.

DETAILED DESCRIPTION OF THE INVENTION

The present invention relates to a portable gas container cart or caddy to be used for the safe transportation of flammable gas tanks. The gas tanks can be pressurized or liquefied. In a preferred embodiment, the portable gas container cart is used for transporting gas tanks, such as propane tanks, used for barbeque grills.

A preferred embodiment of the invention is described in more detail herein below with reference to the drawings showing some embodiments thereof. The preferred embodiment is exemplary in nature and can be modified by the skilled artisan.

The gas container cart can be made of a metal, alloy, wood, plastic, steel, rubber, and the like, with the exception of the fastening element. The fastening element can be made of rope, leather, fabrics, rubber, and the like.

Referring to FIG. 1, a gas container cart has two parallel plates (60) with a top portion (100), a bottom portion (110), a front end (120) and a back end (130). Each parallel plate has a pair of grooves (90) on the top portion of the parallel plates (100), wherein the grooves (90) are capable of holding the gas container (30). The bottom portion of the parallel plates (110) shall bear the weight of the gas container (30).

The gas container cart has two connecting elements (40), one connecting element which is located at the front end of the gas container cart (120), and another which is located at the back end of the gas container cart (130). The two connecting elements (40) connect the two parallel plates (60).

A fastening element (70) is attached to both connecting elements (40). A reversibly attachable end of the fastening element (80) is in the shape of a hook that is latched onto the connecting element (40) located at the front end of the parallel plates (120). A gas container (30) is fastened into the grooves (90) by the fastening element (70).

The gas container cart is pulled manually by a handle (10). The handle has a proximal end (140) rotatably attached to a connecting element (30) at the front end the gas container cart (120). The handle (10) has a distal end (150) in the shape of a hook that an individual can hold onto when manually carrying the gas container cart on its wheels (50).

Figure 2:
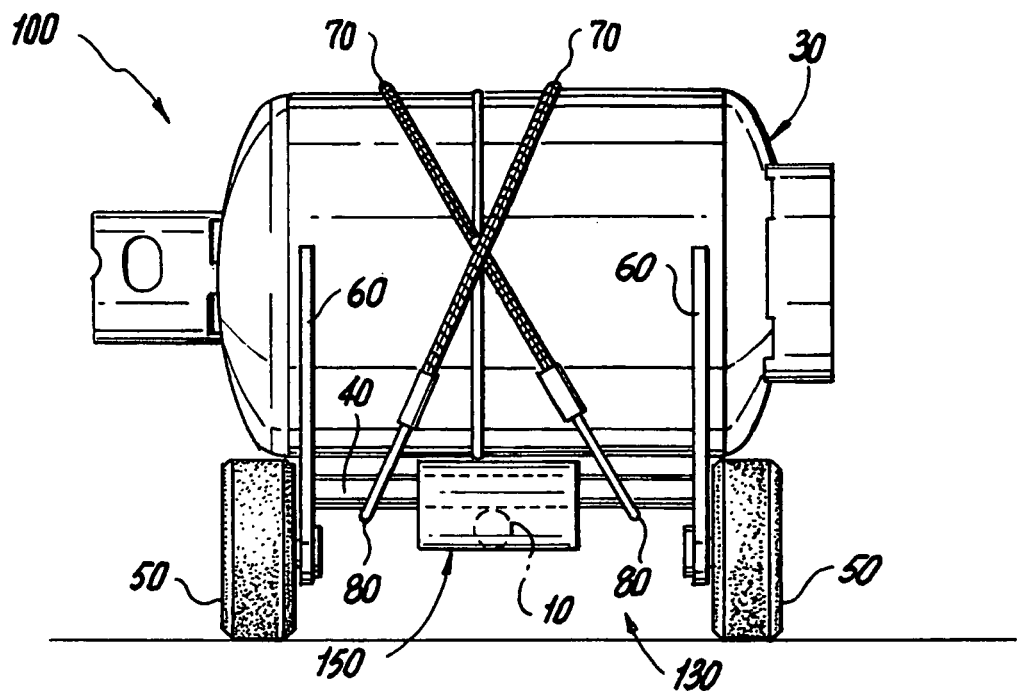
Figure 3:
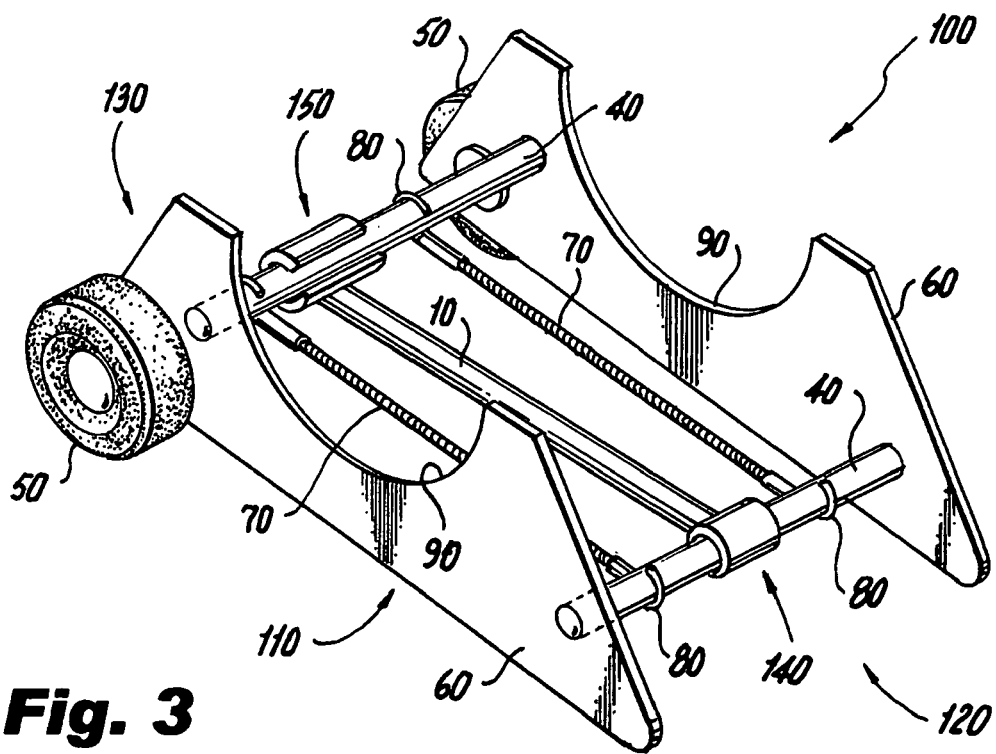

Referring to FIGS. 2 and 3, the gas container cart is in a stable position. The handle (10) has its distal end attached to a connecting element located at the back end of the gas container cart (130). The gas container cart has the bottom portion of the parallel plates (110) in a horizontal position situated on the ground. FIG. 2 depicts the stationary gas container cart with the gas container, and FIG. 3 depicts the stationary gas container cart without the gas container.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A portable gas container cart comprising:
   (a) two parallel plates comprising a top portion, a bottom portion, a frontal end and a back end, wherein said parallel plates are connected by a plurality of connecting elements;
   (b) a pair of grooves located on the top portion of said parallel plates and centrally located between the frontal and back ends of said parallel plates, wherein said pair of grooves are capable of holding said gas container;
   (c) a rotatable handle comprising a distal end and a proximal end, wherein said proximal end is rotatably connected to one of said connecting elements, and wherein said distal end can be rotated across the bottom portion of said parallel plates and attached to another of said connecting elements;
   (d) at least one wheel attached to each of said parallel plates on the back end of said parallel plates; and
   (e) at least one fastening element, comprising a first end attached to one of said connecting elements, and a second end which can be reversibly attached to a second of said connecting elements, wherein said first and second ends of said fastening element are attachable to connecting elements situated on both the frontal end and the back end of said parallel plates.

2. The portable gas container according to claim 1, wherein said fastening element is capable of fastening a gas container in said pair of grooves.

3. The portable gas container according to claim 1, wherein said grooves correspond to the shape of said gas container.

4. The portable gas container according to claim 1, wherein said distal end of said rotatable handle is in the shape of a hook that is capable of latching onto one of said connecting elements located on the frontal end or back end of said parallel plates.

5. The portable gas container according to claim 1, wherein said gas container is a propane tank container.

6. The portable gas container according to claim 5, wherein said gas container is suitable for barbeque grills.

7. The portable gas container according to claim 1, wherein the length of said fastening element is adjustable.

8. The portable gas container according to claim 1, wherein said parallel plates are connected by two connecting elements.

9. The portable gas container according to claim 1, wherein said connecting elements are cylindrical by shape.

10. The portable gas container according to claim 1, wherein said reversibly attachable end of said fastening element is in the shape of a hook that is capable of latching onto one of said connecting elements.

* * * * *

UNITED STATES PATENT AND TRADEMARK OFFICE
CERTIFICATE OF CORRECTION

PATENT NO. : 7,325,814 B2  Page 1 of 1
APPLICATION NO. : 11/238578
DATED : February 5, 2008
INVENTOR(S) : Ernest Sparacino It is certified that error appears in the above-identified patent and that said Letters Patent is hereby corrected as shown below:

Please insert;

[56]  References Cited
U.S. PATENT DOCUMENTS

| Patent No. | Date | Inventor |
|---|---|---|
| 6,334,622 B1 | 1/2002 | Romero |
| 6,733,017 B2 | 5/2004 | Intravatola |
| 4,802,515 | 2/1989 | Pytryga et al |
| 5,318,322 | 6/1994 | Home |
| 5,873,500 | 2/1999 | Homburg et al. |
| 1,244,030 | 10/1917 | Cave |
| 6,523,838 B2 | 2/2003 | Richardson, IV |
| 5,494,191 | 2/1996 | Benson |

Signed and Sealed this

First Day of July, 2008

JON W. DUDAS
*Director of the United States Patent and Trademark Office*